UNITED STATES PATENT OFFICE.

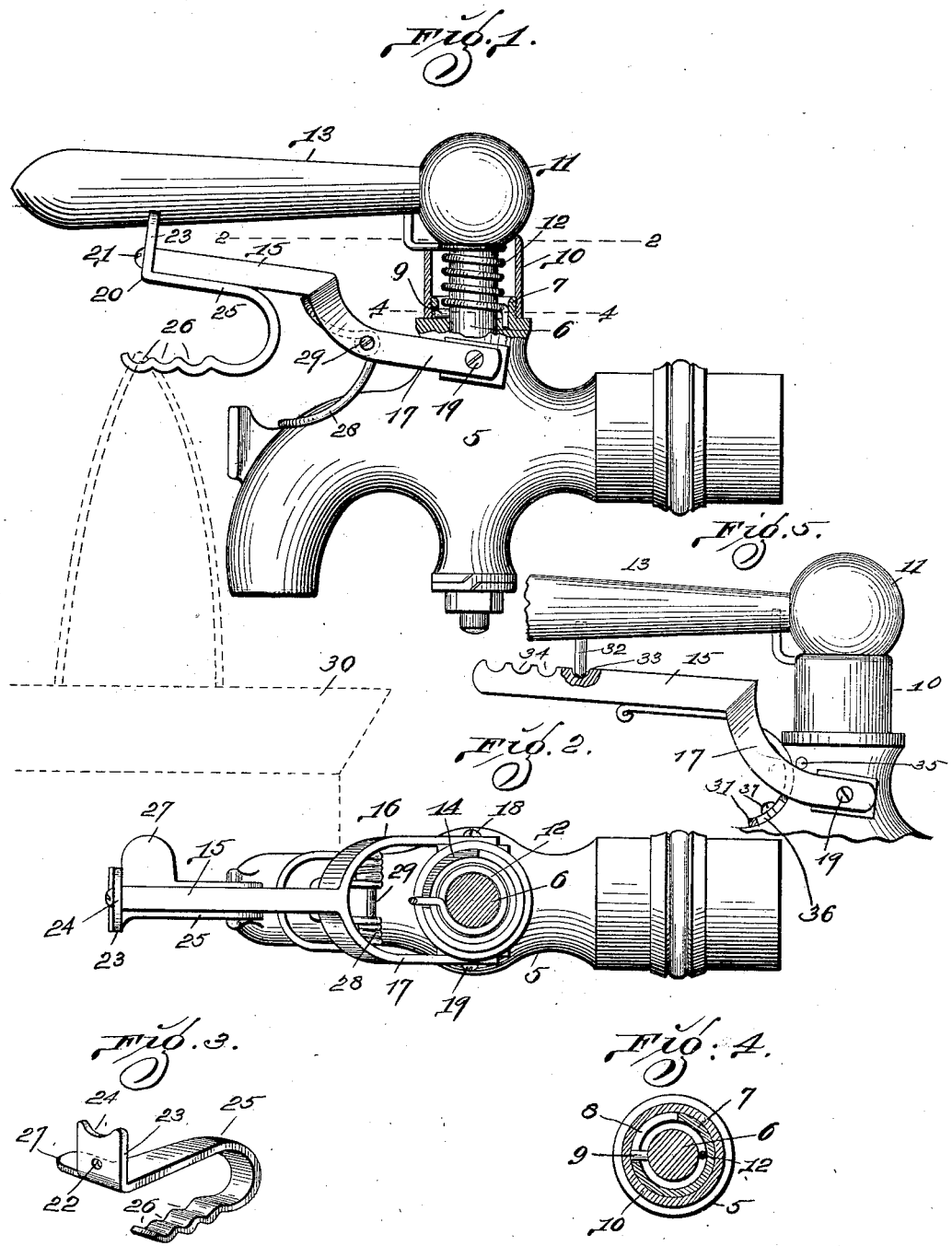

HENRY E. KNOTTNERUS, OF ST. LOUIS, MISSOURI, ASSIGNOR TO H. C. NEUN, OF SAME PLACE.

AUTOMATIC GAGING-FAUCET.

SPECIFICATION forming part of Letters Patent No. 606,559, dated June 28, 1898.

Application filed July 12, 1897. Serial No. 644,279. (No model.)

*To all whom it may concern:*

Be it known that I, HENRY E. KNOTTNERUS, of the city of St. Louis, State of Missouri, have invented certain new and useful Improvements in Automatic Gaging-Faucets, of which the following is a full, clear, and exact description, reference being had to the accompanying drawings, forming a part hereof.

My invention relates to faucets; and it consists of the novel construction, combination, and arrangement of parts hereinafter shown, described, and claimed.

Figure 1 is a side elevation, partly in section, of a faucet constructed in accordance with the principles of my invention. Fig. 2 is a horizontal section taken approximately on the line 2 2 of Fig. 1. Fig. 3 is a view in perspective of a hook which I employ. Fig. 4 is a horizontal section taken approximately on the line 4 4 of Fig. 1. Fig. 5 is a modification.

The object of my invention is to provide a faucet which will measure liquid by weight and automatically close itself when the desired weight of liquid has been drawn.

Referring by numerals to the drawings, the tubular portion 5 is of the ordinary construction, and the valve-stem 6 is mounted in the tubular portion 5 in the ordinary way. An annular flange 7 extends upwardly from the tubular portion 5 around the valve-stem 6. A slot 8 is formed horizontally in the upper edge of the flange 7, and a pin 9 projects outwardly from the valve-stem and operates in said slot. The slot 8 is of such length that it will permit the valve-stem 6 to make one-quarter of a revolution, and the pin 9 is so mounted in the valve-stem 6 that when said pin projects forwardly, as in Figs. 1 and 4, the valve is opened, and when the pin projects laterally the valve is closed. The flange 7 is exteriorly screw-threaded, and the cylindrical casing 10 is screw-seated upon said flange, said casing extending upwardly to the head 11 of the valve-stem. The coil-spring 12 is placed around the valve-stem 6 with its lower end secured to the material forming the valve-seat and its upper end extending outwardly below the head 11 and then upwardly into the handle 13. A slot 14 is formed in the upper edge of the casing 10, as required, to allow the upper end of the spring 13 to make one-quarter of a revolution. The tension of the spring 12 is exerted to hold the valve in its closed position. The lever 15 is bifurcated at its rear end, thus forming the arms 16 and 17, and the lever is placed in a horizontal position in front of the valve-stem 6 and below the handle 13, the ends of the arms 16 and 17 being pivotally attached to the tubular portion 5 by means of the screws 18 and 19. The hook 20 is attached to the forward end of the lever 15 by means of a screw 21, inserted through the opening 22 and screw-seated in the lever.

The hook 20 consists of the vertical portion 23, which is placed against the forward end of the lever and has the notch 24 in its upper end to receive the handle 13, the hooked portion 25, which extends backwardly and downwardly and then forwardly from the portion 23, and having the recess 26 formed in the upper side of its lower end, and the ear 27, projecting laterally from the upper end of the portion 25.

The spring 28 is placed between the arms 16 and 17 and secured in position by means of the pin 29, the free end of said spring extending downwardly and engaging the forward end of the faucet and the tension of said spring being exerted to hold the forward end of the lever 15 elevated.

When the forward end of the lever 15 is depressed to disengage the handle 13 from the notch 24, the tension of the spring 12 will operate to close the valve. When it is desired to draw a quantity of beer or other liquid, the pail 30 is placed in position with the bail engaging the hook 20. Then the handle 13 is operated to open the faucet and bring said handle into engagement with the notch 24. When the liquid in the pail becomes heavy enough to overcome the tension of the spring 28, the lever 15 will be depressed and the valve will be closed by the tension of the spring 12. If the spring 28 is adjusted to sustain the weight of a bucket containing five cents' worth of beer, then each customer calling for five cents' worth of beer will receive his certain amount of beer by weight instead of receiving a bucket filled with foam and weighing nothing.

The ear 27 serves as a handle for operating the lever 15 when it is desired to draw a glass of liquid or to draw liquid without applying its weight to operate said lever 15.

Referring to the modification shown in Fig. 5, the leaf-spring 31 is attached to the tubular portion of the faucet and its free end extends upwardly and forwardly under the lever 15, the tension of said spring being exerted to hold the lever elevated. A pin 32 is fixed in the handle 13 and extends downwardly, the lower end of said pin engaging in the aperture 33, formed in the upper face of the free end of the lever 15. The notches 34 are formed in the upper face of the free end of the lever 15 in front of the pin 32, thus producing hooks to receive the pail-bail.

The pin 35 is inserted into the material forming the seat of the valve 6 and forms a stop to limit the upward movement of the lever 15.

In attaching the spring 31 a slot 36 is formed through the spring, said slot being elongated longitudinally of the spring, and the screw 37 is inserted through the slot into the tubular portion 5, as required, to allow longitudinal adjustment of the spring, thus regulating the strength of the spring and determining the amount of weight required to operate the lever 15.

I claim—

1. In a faucet, a spring-actuated valve-stem, a handle attached to said valve-stem for operating the same, a lever pivotally attached to the faucet and engaging said handle, a spring attached to said lever and engaging the faucet and a hook upon said lever, substantially as specified.

2. In combination with a faucet having a spring-actuated valve-stem, a handle secured to the upper end of the valve-stem for operating the same, a lever pivotally attached to the faucet, a spring secured to said lever and engaging the faucet as required to hold the free end of the lever yieldingly in engagement with the handle, and a hook attached to the outer end of the lever, the upper end of which hook is constructed to engage the faucet-handle, substantially as specified.

3. In combination with a faucet having a spring-actuated valve-stem, an operating-handle attached to the upper end of said valve-stem, a spring-actuated lever pivoted to the faucet, a hook fixed to the end of the lever, in the upturned end of which is formed a recess for receiving the faucet-handle, and an ear formed integral with the side of the hook.

4. A faucet constructed with a spring-actuated valve-stem, a handle secured to the upper end of said valve-stem, a pin projecting downwardly from said handle, a lever pivoted to the faucet, in the outer top end of which is formed a series of notches, and said lever being provided with a recess to receive the lower end of the pin and a spring secured to the faucet and normally elevating the outer end of the lever, substantially as specified.

In testimony whereof I affix my signature in presence of two witnesses.

HENRY E. KNOTTNERUS.

Witnesses:
EDWARD E. LONGAN,
A. J. MCCAULEY.